US008335870B2

(12) United States Patent
Kim

(10) Patent No.: US 8,335,870 B2
(45) Date of Patent: Dec. 18, 2012

(54) METHOD OF CONTROLLING MOBILE TERMINAL ON EXTERNAL DEVICE BASIS AND EXTERNAL DEVICE OPERATING SYSTEM USING THE SAME

(75) Inventor: Soon Do Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 12/610,539

(22) Filed: Nov. 2, 2009

(65) Prior Publication Data
US 2010/0121991 A1  May 13, 2010

(30) Foreign Application Priority Data

Nov. 10, 2008  (KR) ........................ 10-2008-0111240

(51) Int. Cl.
*G06F 3/00* (2006.01)
(52) U.S. Cl. ........................................................ 710/16
(58) Field of Classification Search ...................... 710/16
See application file for complete search history.

(56) References Cited

U.S. PATENT DOCUMENTS

| 7,849,238 B2 * | 12/2010 | Wang et al. ...................... 710/63 |
| 2006/0052072 A1 | 3/2006 | Hess et al. |
| 2008/0248835 A1 | 10/2008 | Hansson et al. |
| 2009/0064202 A1 * | 3/2009 | Lee et al. ....................... 719/328 |

* cited by examiner

*Primary Examiner* — Chun-Kuan Lee
(74) *Attorney, Agent, or Firm* — Jefferson IP Law, LLP

(57) ABSTRACT

A method of controlling a mobile terminal on an external device basis and an external device operation system using the same are provided. The system includes a connector for connecting an external device, a switch for determining a type of the external device connected to the connector and switching according to the type thereof, a transceiver to be connected, if the external device is an external device which requires a high speed data transmission, to the external device according to switching of the switch, and a USB switch to be connected, if the external device is an external device which does not require a high speed data transmission, to the external device according to switching of the switch.

19 Claims, 4 Drawing Sheets

METHOD OF CONTROLLING MOBILE TERMINAL ON EXTERNAL DEVICE BASIS AND EXTERNAL DEVICE OPERATING SYSTEM USING THE SAME

PRIORITY

This application claims the benefit under 35 U.S.C. §119 (a) of a Korean patent application filed in the Korean Intellectual Property Office on Nov. 10, 2008 and assigned Serial No. 2008-0111240, the entire disclosure of which are hereby incorporated by reference.

BACKGROUND OF THE INVENTION

1. Field of the Invention

The present invention relates to a method of controlling a mobile terminal on an external device basis and an external device operating system using the same. More particularly, the present invention relates to a method of controlling a mobile terminal on an external device basis and an external device operating system using the same that can more efficiently transmit and receive data to and from connected various external devices using a connector.

2. Description of the Related Art

Nowadays, due to easy portability, program storage ability, and usability, mobile terminals are widely used in various fields. The mobile communication terminal is very widely used because it can perform communication while moving.

Previously, in order to stabilize a battery and other elements, the mobile terminal had a very large size. However, nowadays, due to development of elements and a battery, the mobile terminal has a reduced weight, size, and thickness.

In order to charge a battery of the mobile terminal, a cable for connecting the mobile terminal and a charger are required. Further, the mobile terminal has a connector interface for connecting the cable. The connector interface is used as a passage for connecting the charger of the mobile terminal and as a passage for supporting Universal Serial Bus (USB) communication of the mobile terminal. Various external devices can be connected to the mobile terminal, and in order to support the connection thereof, various interface units are provided in the mobile terminal. For example, the mobile terminal may have an earphone interface for supporting an earphone function, a USB interface for supporting a USB connection, and a Universal Asynchronous Receiver-Transmitter (UART) interface for supporting an external memory unit.

Various interfaces for supporting various functions of the mobile terminal should be provided in the mobile terminal, and arrangement of such various interfaces has a great influence on structural restriction of the mobile terminal Therefore, the mobile terminal can support functions of various external devices. However, the mobile terminal cannot support the functions due to a structural limitation. Further, because external devices such as an earphone for reproducing audio data, or a memory unit for transmitting and receiving data to and from the mobile terminal require various data transmission forms and speeds, in order for such various external devices to efficiently perform an optimum function, a method of controlling the mobile terminal and the mobile terminal that can support the same are requested.

SUMMARY OF THE INVENTION

An aspect of the present invention is to address at least the above-mentioned problems and/or disadvantages and to provide at least the advantages described below. Accordingly, an aspect of the present invention is to provide a method of controlling a mobile terminal on an external device basis and an external device operating system using the same that can more efficiently transmit and receive data to and from various connected external devices using a connector.

In accordance with an aspect of the present invention, a method of controlling a mobile terminal on an external device basis is provided. The method includes connecting an external device to the mobile terminal, determining a type of the connected external device, and switching, if the connected external device is an external device which requires a high speed data transmission, to connect a transceiver to the external device.

In accordance with another aspect of the present invention, an external device operating system of a mobile terminal is provided. The device includes a connector for connecting an external device, a switch for determining a type of the external device connected to the connector and for switching according to the type thereof, a transceiver to be connected, if the connected external device is an external device which requires a high speed data transmission, to the external device according to switching of the switch, and a USB switch to be connected, if the external device is an external device which does not require a high speed data transmission, to the external device according to switching of the switch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
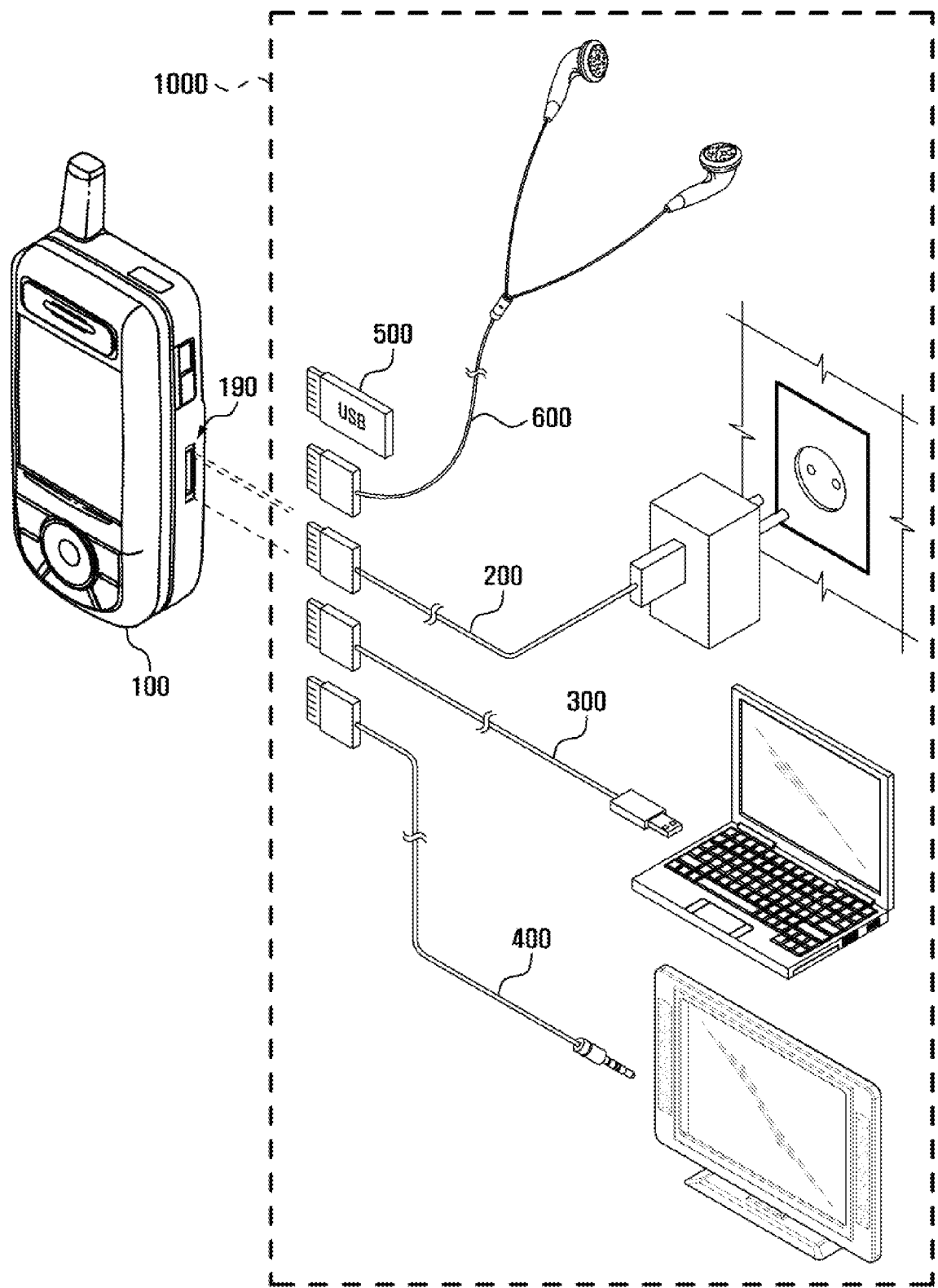
FIG. 1 is a diagram illustrating a mobile terminal and external devices to be connected thereto according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While the present invention may be described in many different forms, specific exemplary embodiments of the present invention are shown in the drawings and are described herein in detail, with the understanding that the present disclosure is to be considered as an exemplification of the principles of the invention and is not intended to limit the invention to the specific exemplary embodiments illustrated.

FIG. 1 is a diagram illustrating a mobile terminal and external devices to be connected thereto according to an exemplary embodiment of the present invention.

Referring to FIG. 1, an external device operation system according to an exemplary embodiment of the present invention includes an external device 1000, a mobile terminal 100 for performing a terminal operation control according to a type of the external device 1000, and an interface unit 190 provided at one side of the mobile terminal 100 to connect various external devices. The mobile terminal 100 has the interface unit 190 for commonly connecting the external devices. The mobile terminal 100 uses different data transmission methods according to a type of various external devices to be connected to the interface unit 190.

The mobile terminal 100 has a routine for determining the external device 1000 connected to the interface unit 190, a switch for differently supporting a data transmission method according to the determined external device 1000, and a path for supporting each function of various external devices.

The external device 1000 may be a charger 200, a notebook computer 300, a monitor 400, an external memory 500, and an earphone 600, and the external device 1000 may each have a common interface for connecting to the interface unit 190. The external device 1000 may have a separate cable for commonly connecting the external device 1000 to the interface unit 190 of the mobile terminal 100. In an exemplary embodiment, the external device 1000 is described as the charger 200, the notebook computer 300, the monitor 400, the external memory 500, and the earphone 600. However, the present invention is not limited thereto. That is, the external device 1000 may be another terminal, for example a Moving Picture Experts Group layer-3 (MP3) player, a Personal Digital Assistant (PDA), and a game player in addition to the above-described devices.

Figure 2:
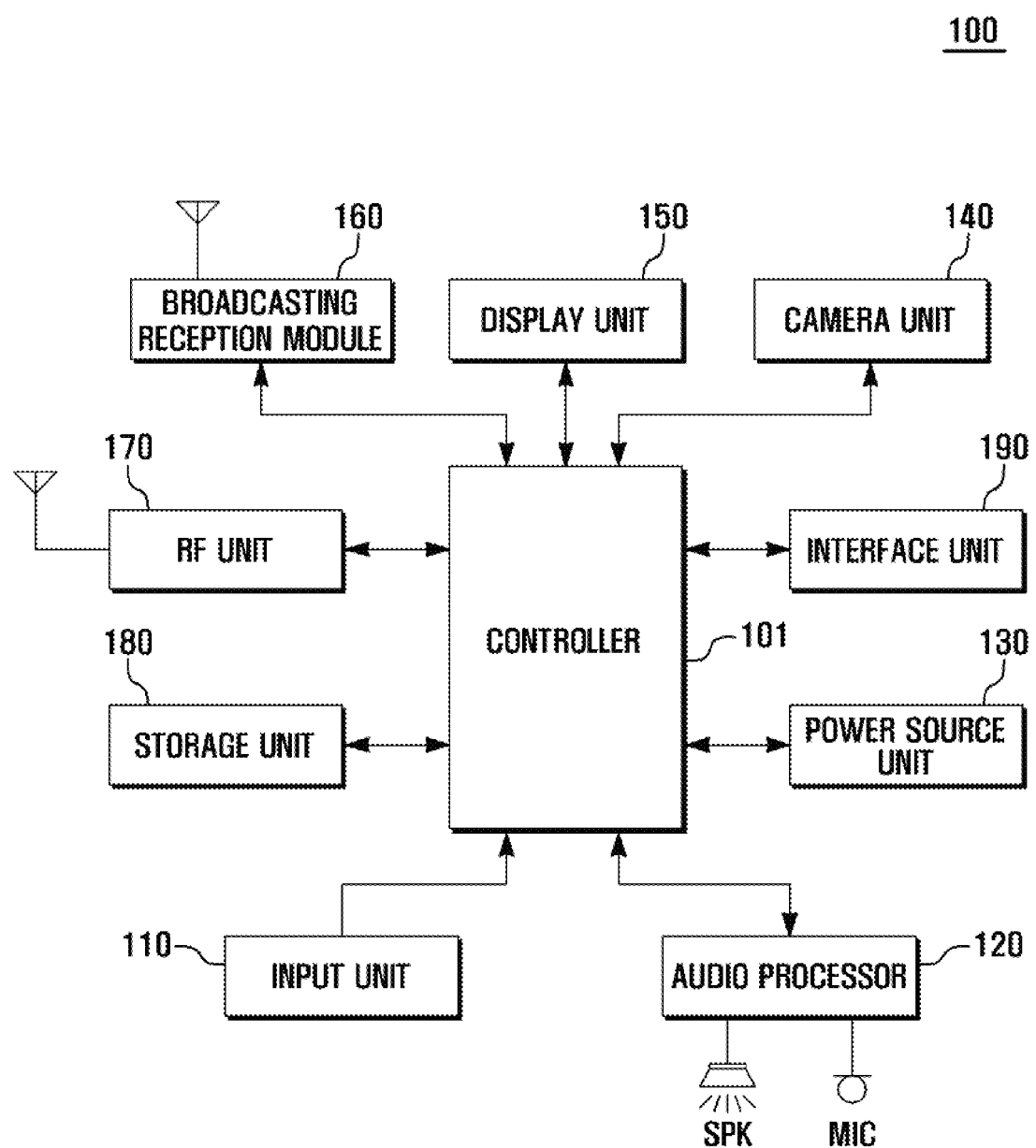
FIG. 2 is a block diagram illustrating a configuration of a mobile terminal according to an exemplary embodiment of the present invention.

FIG. 2 is a block diagram illustrating a configuration of the mobile terminal 100 according to an exemplary embodiment of the present invention.

Referring to FIGS. 1 and 2, the mobile terminal 100 includes a controller 101, an input unit 110, an audio processor 120, a power source unit 130, a camera unit 140, a display unit 150, a broadcasting reception module 160, a Radio Frequency (RF) unit 170, a storage unit 180, and an interface unit 190.

The mobile terminal 100 having the above-described configuration performs various functions according to the external device 1000 connected to the interface unit 190. For example, when the earphone 600 is connected to the interface unit 190, the controller 101 controls to output an audio signal to the earphone 600 by forming an audio path between the audio processor 120 and the earphone 600 and to transmit. If an ear microphone is provided in the earphone 600 while a communication function is performing, the controller 101 controls to transmit an audio signal input to the ear microphone of the earphone 600 to another mobile terminal through the RF unit 170. More particularly, in an exemplary embodiment, the mobile terminal 100 controls the switch formed within the interface unit 190 to transmit low speed data or high speed data according to the type of the connected external device 1000. That is, when the mobile terminal 100 receives or inputs a high quality of an image using the broadcasting reception module 160 or the camera unit 140, the mobile terminal 100 transmits a high quality of the image to the external device, for example, to the monitor 400 using a high speed data transmission unit provided in the interface unit 190.

The input unit 110 is used for inputting numeral or character information by a user and includes a plurality of input keys and function keys for setting various functions. The function keys include a direction key, a side key, and a hotkey set to perform a specific function. More particularly, in an exemplary embodiment, when the input unit 110 is connected to an external device, for example a communication device connected to the interface unit 190, the input unit 110 retrieves data stored within the communication device, generates an input signal of the data according to a user request, and outputs the signal to the controller 101. In order words, the input unit 110 generates an input signal for activating a function according to a type of the external device 1000 connected to the interface unit 190. For example, when the earphone 600 is connected to the interface unit 190, the input unit 110 generates an input signal for activating a communication function and an input signal for reproducing a file according to user request and outputs the signal to the controller 101.

The audio processor 120 includes a speaker (SPK) for reproducing audio data transmitted and received when a communication function is activated and a microphone (MIC) for inputting a user's sound or other audio signals generated while performing communication. More particularly, in an exemplary embodiment, when the earphone 600 is connected to the interface unit 190, the audio processor 120 inactivates a function of the microphone (MIC) and the speaker (SPK), outputs an audio signal to the earphone 600 through the interface unit 190, and outputs an audio signal input by an ear microphone provided in the earphone 600 to the RF unit 170 through the controller 101. When the external device 1000 is connected to the interface unit 190, the audio processor 120 outputs an audio alarm signal according to a device connection, and when the external device 1000 is separated from the interface unit 190, the audio processor 120 outputs an audio alarm signal according to the separation of an external device.

The power source unit 130 supplies necessary power to units of the mobile terminal 100. The power source unit 130 is formed using at least one of a rechargeable battery and a chemical battery that can be charged and discharged several times. In an exemplary embodiment, when the charger 200 is connected to the interface unit 190, the power source unit 130 charges the battery using power supplied from the charger 200. Further, when the notebook computer 300 is connected to the interface unit 190, the power source unit 130 may charge the battery using power supplied to the notebook computer 300 by a user's control. When an external device, for example the external memory 500 that does not include a separate battery is connected to the interface unit 190, the power source unit 130 may supply power to the external memory 500 in order to activate to the external memory 500.

The camera unit 140 receives an image input to a lens according to an input signal generating in the input unit 110, and outputs the received image to the controller 101, or directly outputs the received image to the display unit 150 as a preview image. When the mobile terminal 100 activates an audiovisual communication function, the camera unit 140 having such an image input function inputs an image by the control of the controller 101. For this, the camera unit 140 photographs an image from a lens and includes a camera sensor (not shown) for converting the photographed image into an electrical signal and a signal processor (not shown) for converting an analog video signal photographed by the camera sensor into digital data. Here, a Charge Coupled Device (CCD) sensor can be applied to the camera sensor, and a Digital Signal Processor (DSP) may be used as the signal processor. However, the camera sensor and the digital signal processor are not limited thereto. In an exemplary embodiment, the camera unit 140 outputs the received image to the controller 101, and the image output to the controller 101 is output to the external device 1000 through the interface unit 190. That is, when the monitor 400 is connected to the interface unit 190, an image input to the camera unit 140 is output to the monitor 400 through the interface unit 190. In this case, data output to the outside through the interface unit 190 are output without a separate compression process through the interface unit 190 and for this, the interface unit 190 includes a switch to be switched in a high speed.

The display unit 150 displays image data output from the controller 101, user data requested by a user, and additional function screen. The display unit 150 displays a basic screen of the mobile terminal 100, i.e. a standby screen, menu screen, and information list display screen stored in the storage unit 180. The display unit 150 may use a Liquid Crystal Display (LCD). When the display unit 150 uses a touch screen, the display unit 150 may perform a function as an input unit. More particularly, in an exemplary embodiment, the display unit 150 may display different screens according to the external device 1000 connected to the interface unit 190. That is, when the charger 200 is connected to the interface unit 190, the display unit 150 may display a pop-up message notifying that the charger 200 has been connected for a time period, or an image corresponding to the message. The display unit 150 can display a residual charging quantity of a battery in real time while being charged by the charger 200. When a communication device, for example the notebook computer 300 or the external memory 500, is connected to the interface unit 190, the display unit 150 may output a pop-up message notifying that the communication device is connected to the interface unit 190, or an image corresponding to the message. Until determining the stored information of the communication device, the display unit 150 may output an image or an icon corresponding to a communication mode of transmitting and receiving a signal to and from the communication device. When the external device 1000 is separated from the interface unit 190, the display unit 150 can output an image corresponding to an alarm notifying that the external device is separated from the interface unit 190. In an exemplary embodiment, the alarm is temporarily activated and removed. After an alarm is temporarily activated, a mode of the display unit 150 is converted to a sleep mode for saving power by the control of the controller 101 and thus power of the display unit 150 is saved. Further, when the broadcasting reception module 160 is activated, the display unit 150 can output the received broadcasting signal according to activation of the broadcasting reception module 160. That is, the display unit 150 can output a broadcasting channel list screen, screen corresponding to a broadcasting signal received in a specific broadcasting channel, and broadcasting channel list screen selected by a user. When the camera unit 140 is activated, the display unit 150 can output an image input by the camera unit 140 to a preview image. When the monitor 400 is connected to the interface unit 190, an image output function of the display unit 150 may not be operated. That is, when a broadcasting signal received by the broadcasting reception module 160, an image input by the camera unit 140, or a moving picture stored in the storage unit 180 is output to the monitor 400 through the interface unit 190, the display unit 150 may not output a separate image.

The broadcasting reception module 160 is a communication module for receiving a broadcasting signal transmitted through a broadcasting network. That is, the broadcasting reception module 160 is a module for receiving a broadcasting signal from a broadcasting network and is a one directional communication module. The broadcasting reception module 160 has a reverse order arrangement of units of a broadcasting transmission system for transmitting broadcasting information and demodulates and decodes a received broadcasting signal. The broadcasting reception module 160 outputs a decoded signal to the display unit 150 through the controller 101. More particularly, in an exemplary embodiment, the broadcasting reception module 160 outputs a broadcasting signal, having received from the broadcasting network to the outside through the interface unit 190 according to a user request. For this, the mobile terminal 100 outputs a separate menu item for outputting a broadcasting signal to the outside, to the display unit 150 and when a user selects the corresponding menu item and the monitor 400 for outputting a broadcasting signal is connected to the interface unit 190, the mobile terminal 100 performs a broadcasting signal outside output function. In this process, the mobile terminal 100 can output a broadcasting signal received by the broadcasting reception module 160 to the monitor 400 using a high speed data transmission switch of the interface unit 190 without a separate compression process.

The RF unit 170 transmits and receives a signal related to a mobile phone communication, a Short Message Service (SMS), a Multimedia Message Service (MMS), or a data communication. Further, the RF unit 170 converts sound data and control data into a wireless signal and transmits the converted signal, and receives a wireless signal and converts the wireless signal into sound data and control data, and outputs the converted data. For this, the RF unit 170 includes an RF transmitter (not shown) for up-converting a frequency of a signal to be transmitted and amplifying the signal, and an RF receiver (not shown) for low-noise amplifying a received signal and down-converting a frequency of the signal. When the charger 200 is connected to the interface unit 190, the RF unit 170 directly receives power from the charger 200 by the control of the controller 101. Further, when a communication device, for example the notebook computer 300 or the external memory 500 is connected to the interface unit 190, the RF unit 170 transmits data received from the notebook computer 300 or information stored in the external memory 500 by wireless to the outside by the control of the controller 101.

The storage unit 180 stores an Operating System (OS) and application programs for operating the mobile terminal 100 and each function of the mobile terminal 100, for example a file reproducing function, a camera function, a broadcasting viewing function, a communication function, and a data read and write function. Further, the storage unit 180 stores user data generated when using the mobile terminal 100 and data received through a communication channel. For this, the storage unit 180 includes a program memory and a data memory.

The program memory stores application programs for supporting the function of the mobile terminal 100, particularly an external device determination routine and various application programs for supporting an external device. The external device determination routine is loaded in the controller 101, and when the external device 1000 is connected to the interface unit 190, the controller 101 determines a type of the external device 1000 through a signal generated while transmitting and receiving a signal to and from the external device 1000 or an ID value transmitted from the external device 1000. For example, when it is assumed that the earphone 600 includes a first resistor and the monitor 400 includes a second resistor, if the earphone 600 or the monitor 400 is connected to the interface unit 190, the controller 101 determines a resistor value included in the external device and determines a type of the external device. Further, when the monitor 400 is connected to the interface unit 190, the controller 101 determines a data signal value output from the monitor 400 and determines a type of the external device using the data signal.

The data memory stores data generated while performing the programs, data input by a user, and data downloaded from the outside using the RF unit 170. More particularly, the data memory stores reference values for determining the external device 1000 according to a signal output from the external device 1000 connected to the interface unit 190. That is, the data memory stores a reference value of a resistance value on an external device basis, or a reference value of a data signal to be output by an external device connected to the interface unit 190.

When the earphone 600 is connected to the interface unit 190, the interface unit 190 controls to search for an audio path for supporting an earphone function of the mobile terminal 100 and to connect the audio path to the connected earphone 600. When the charger 200 is connected to the interface unit 190, the interface unit 190 searches for a power source path from the power source unit 130 and outputs power from the charger 200 to the power source unit 130 via the power source path. Further, when the notebook computer 300 or the external memory 500 is connected to the interface unit 190, the interface unit 190 forms a communication path with the controller 101 and transmits and receives data by the control of the controller 101. When the monitor 400 is connected to the interface unit 190, the interface unit 190 forms a communication path with the controller 101 and outputs one of data stored in the storage unit 180, data received by the broadcasting reception module 160, and data input by the camera unit 140 to the monitor 400 by the control of the controller 101. In this process, the mobile terminal 100 uses a transceiver Integrated Circuit (IC) in order to more efficiently output data. A detailed configuration of the interface unit 190 is described in detail later with reference to FIG. 3.

The controller 101 controls a signal flow between units of the mobile terminal 100 and to activate various user functions of the mobile terminal 100 according to a type of external devices connected to the interface unit 190. For example, when the charger 200 is connected to the interface unit 190, the controller 101 controls to charge the power source unit 130 using power output from the charger 200, and in this process, the controller 101 controls a quick charge of the power source unit 130. Further, the controller 101 activates the broadcasting reception module 160 and the camera unit 140 according to a user request and controls to output data received from the broadcasting reception module 160 and the camera unit 140 to the external device 1000 through the interface unit 190 according to user request. When the earphone 600 is connected to the interface unit 190, the controller 101 controls to change an audio path so as to output an audio signal of the mobile terminal 100 through the earphone 600 without outputting through the speaker (SPK). More particularly, in an exemplary embodiment, in a process of outputting a relatively great capacity of data generating from the broadcasting reception module 160 and the camera unit 140 to the external device 1000, the controller 101 controls to output data using a switch of the interface unit 190 for high speed switching without a compression process of data in order to control quick data transmission. A control function of the controller 101 is described in detail in relation to a description of the interface unit of FIG. 3.

Figure 3:
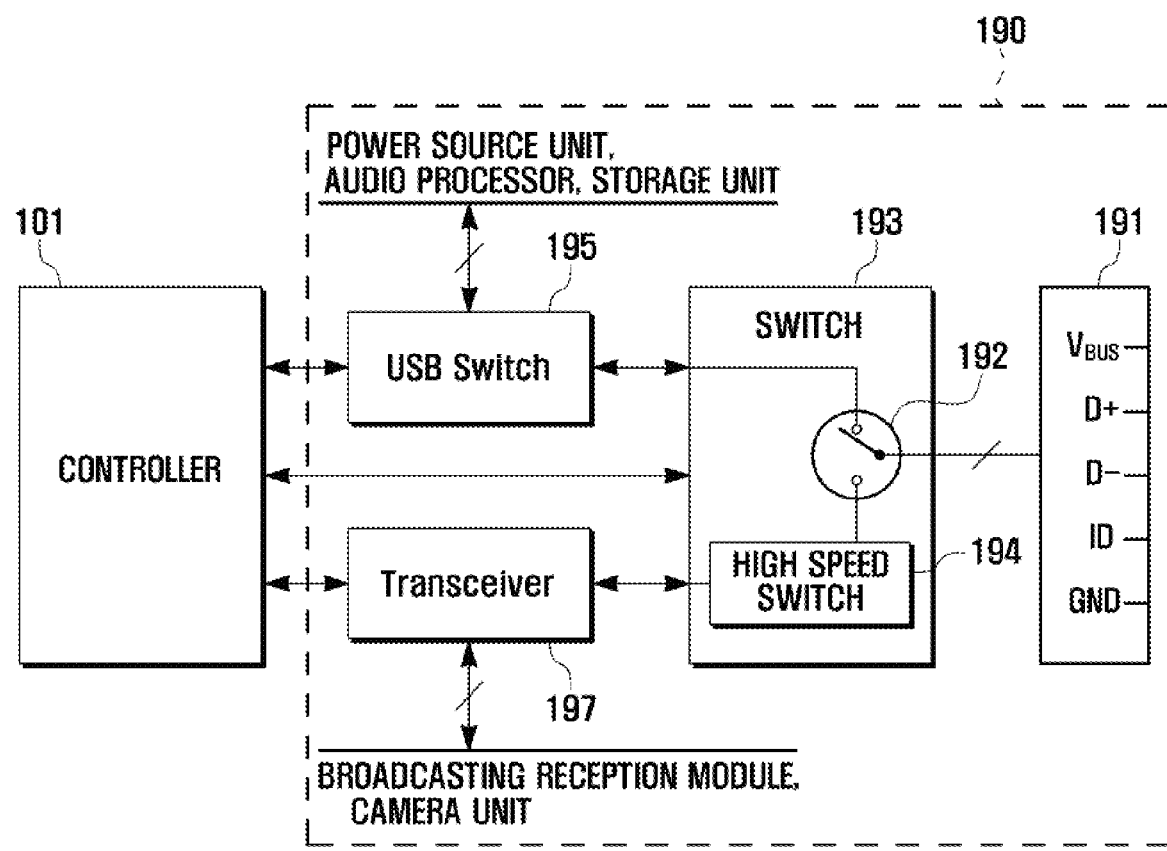
FIG. 3 is a block diagram illustrating a configuration of an interface unit in a mobile terminal according to an exemplary embodiment of the present invention.

FIG. 3 is a block diagram illustrating a configuration of the interface unit 190 in the mobile terminal 100 of FIG. 2 according to an exemplary embodiment of the present invention.

Referring to FIG. 3, the interface unit 190 includes a connector 191, a switch 193, a high speed switch 194, a Universal Serial Bus (USB) switch 195, and a transceiver 197.

When an external device is connected to the interface unit 190, the switch 193 determines a type of the external device 1000, and when an external device which requires a high speed data transmission is connected to the interface unit 190, the interface unit 190 activates the transceiver 197. When an external device for supporting other user functions other than high speed data transmission is connected to the interface unit 190, the interface unit 190 controls to activate the USB switch 195 and to form a path between units for supporting the corresponding function.

The connector 191 has a shape which can be commonly connected with various external devices and has a structure which can be connected with a cable connected to the external device 1000, as needed. In order to commonly connect the external device 1000, the connector 191 includes a VBus port (VBus), which is a reference voltage port, a first signal port (D+), and a second signal port (D−) for transmitting and receiving data, and an ID port (ID) and a ground connection port (GND) for receiving different resistance values on an external device basis.

The switch 193 is located between the connector 191 and at least one of the transceiver 197 and the USB switch 195 to determine a type of the external device 1000 connected to the connector 191, and switches to connect at least one of the USB switch 195 and the transceiver 197 in a signal path according to the determined type of the external device 1000. The switch 193 can receive reference value information stored in the storage unit 180 through the controller 101 in order to determine a type of the external device 1000 connected to the connector 191, or can store the reference value information about external devices in an embedded form when manufacturing the switch 193. For example, when the earphone 600 is connected to the connector 191, the switch 193 receives a signal output from the ID port (ID) activated according to an earphone connection and determines a type of the external device as the earphone 600 based on the signal. In this case, the signal output from the ID port may be a specific resistance value mounted in the earphone 600 and thus the ID value may be a value corresponding to a specific resistance value. In a similar way, when the monitor 400 is connected to the connector 191, the switch 193 receives a signal corresponding to a specific resistance value set to the monitor 400 through the ID port (ID) and determines whether the monitor 400 is connected based on the signal. Further, the switch 193 may determine a type of the external device 1000 through a first signal port (D+) and a second signal port (D−). For example, when the charger 200 is connected to the connector 191, if a specific signal is output to the first signal port (D+) by a short circuit for short-circuiting the first signal port (D+) and the second signal port (D−) provided in the charger 200, the switch 193 receives the same signal through the second signal port (D−). Accordingly, the switch 193 can determine that the charger 200 is connected to the connector 191. In a similar way, when the monitor 400 is connected to the connector 191, the monitor 400 outputs a preset signal to the first signal port (D+) and the second signal port (D−), the switch 193 determines whether a specific signal received from the first signal port (D+) and the second signal port (D−) is a preset signal representing the monitor 400 and determines, if a specific signal received from the first signal port (D+) and the second signal port (D−) is a preset signal representing the monitor 400, the external device 1000 connected to the connector 191 as the monitor 400. The switch 193 supports high speed switching according to a type of the external device 1000 connected to the connector 191. For this, the switch 193 includes a first switch 192 for switching to connect a signal path of the connector 191 to at least one of the USB switch 195 and the transceiver 197 via a high speed switch 194 for high speed transmission of data transmitted and received through the transceiver 197. That is, the first switch 192 is a switch for determining a path of the connector 191, and the high speed switch 194 is a switch to be switched in a high speed for high speed transmission of data to be transmitted through the transceiver 197. The transceiver 197 outputs at least one of a video signal received by the broadcasting reception module 160, a video signal input by the camera unit 140, and a video signal stored in the storage unit 180 in a non-compression state to the switch 193, and the switch 193 outputs a video signal of a non-compression state to the external device 1000, particularly the monitor 400 through the connector 191 according to switching of the high speed switch 194.

When an external device, for example the monitor 400, requires a high speed data transmission, the transceiver 197 outputs data stored or received in the mobile terminal 100 in a high speed. The transceiver 197 can output a broadcasting signal received by the broadcasting reception module 160 or a moving picture signal input by the camera unit 140 to an external device connected to the connector 191 through the switch 193 in a non-compression state without a compression process. When transmitting data, the transceiver 197 can support data transmission of about 4 Gbps, and the high speed switch 194 should support a switching speed for supporting data transmission of the transceiver 197.

The USB switch 195 supports external device functions of the mobile terminal 100 other than high speed data transmission and switches a signal path between units for supporting a user function of the mobile terminal 100 of an external device connected to the connector 191. That is, when the earphone 600 is connected to the connector 191, the USB switch 195 switches to form an audio path with the audio processor 120, and when the charger 200 is connected to the connector 191, the USB switch 195 switches to form a charge path with the power source unit 130.

The controller 101 supports reference value information so that the switch 193 determines an external device connected to the connector 191, or controls, when the switch 193 recognizes a type of the external device 1000 connected to the connector 191, to receive the corresponding information and to activate a necessary configuration of the mobile terminal 100. That is, when the earphone 600 is connected to the connector 191, the controller 101 controls to activate the audio processor 120, and when the external memory 500 is connected to the connector 191, the controller 101 controls to activate the storage unit 180 and to output data stored in the external memory 500 to the storage unit 180.

As described above, an external device operation system activates, when an external device which requires a high speed data transmission among external devices connected to the connector 191 is connected to the interface unit 190, the transceiver 197 which requires a high speed data transmission and forms a signal path including the activated transceiver 197 and the high speed switch 194 for transmitting high speed data, thereby improving data transmission efficiency.

As described above, the external device operation system supports to operate various external devices through the connector 191 and supports, when an external device which requires a high speed data transmission among external devices connected to the interface unit 190 is connected to the interface unit 190, a transmission and reception module for transmitting high speed data and a switch, thereby transmitting more efficiently data.

Figure 4:
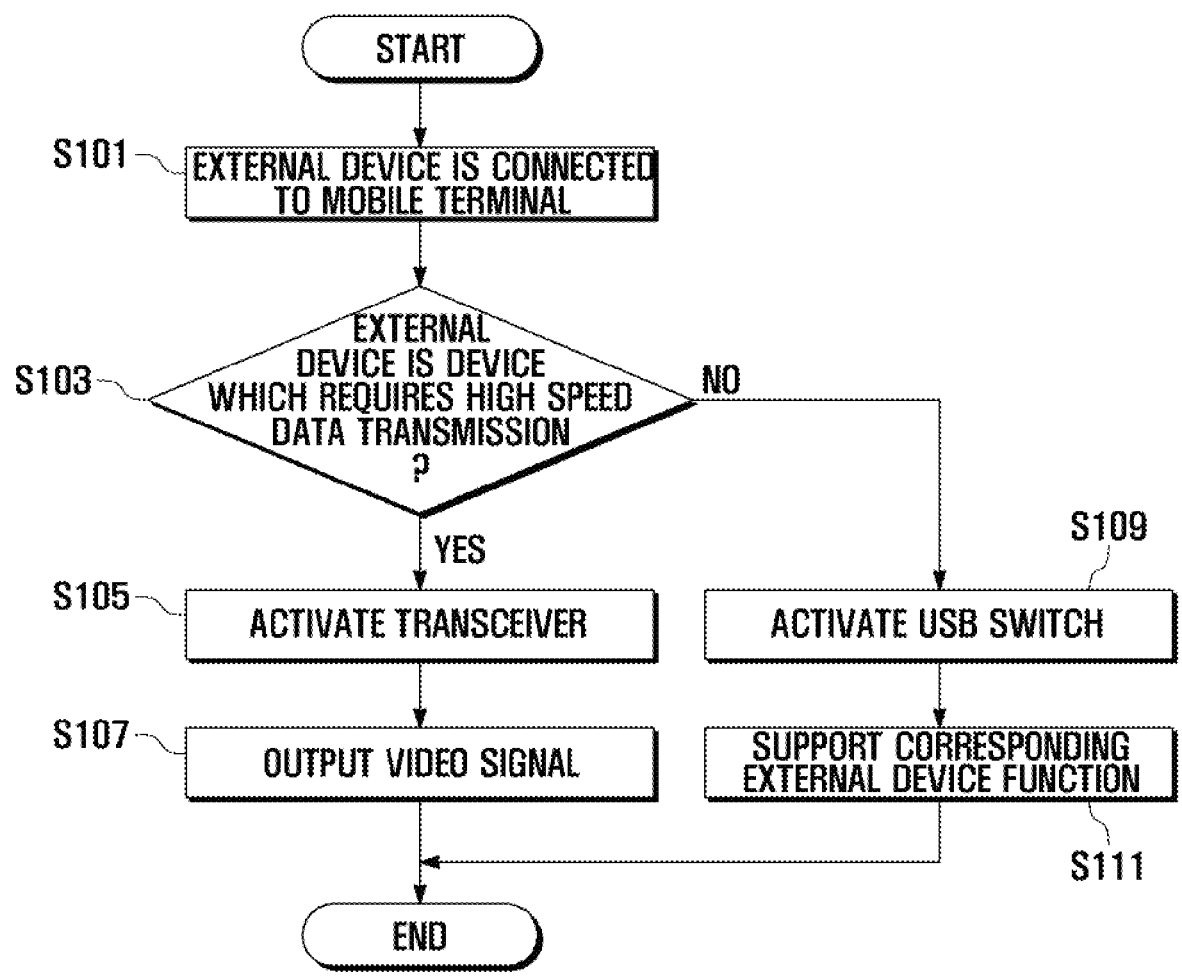
FIG. 4 is a flowchart illustrating a method of controlling a mobile terminal on an external device basis according to an exemplary embodiment of the present invention.

FIG. 4 is a flowchart illustrating a method of controlling a mobile terminal 100 on an external device basis according to an exemplary embodiment of the present invention.

Referring to FIG. 4, when power is supplied to the mobile terminal 100, if an external device is connected to the mobile terminal 100 in step S 101, the switch 193 provided in the interface unit 190 determines whether an external device connected to the connector 191 is a device which requires a high speed data transmission, for example video data in step S103. In this case, the switch 193 determines a type of the external device 1000 using information received through an ID port, a first signal port, and a second signal port provided in the connector 191 to which the external device 1000 is connected. In more detail, the switch 193 determines the type of the external device based on a specific signal value of an external device output through the ID port, for example a specific resistance value which the external device 1000 has. Further, the switch 193 determines the type of the external device 1000 based on a specific signal output from the external device 1000 through the first signal port and the second signal port, or based on a characteristic of a signal in which the switch 193 outputs to the first signal port and the second signal port and received from the first signal port and the second signal port. In order to determine a type of the external devices, the switch 193 stores information about a specific resistance value set on an external device basis, information about a form of a signal received through the first signal port and the second signal port or returned from the first signal port and the second signal port, or refers to the information through the controller 101. Accordingly, the switch 193 determines whether the external device is a device which requires a high speed data transmission using a signal output through the ID port, the first signal port, or the second signal port.

If it is determined that an external device connected to the connector 191 is a device which requires a high speed data transmission, the controller 101 controls to activate the transceiver 197 in step S105. In this case, the switch 193 switches the external device connected to the connector 191 to have a path including the transceiver 197.

If a path including the transceiver 197 is formed, the transceiver 197 is connected to the broadcasting reception module 160, the storage unit 180, or the camera unit 140 to output a video signal corresponding to a video signal output by the broadcasting reception module 160, a video signal stored in the storage unit 180, or a still picture or a moving picture input by the camera unit 140 to the switch 193 in step S107. In this case, as an exemplary embodiment, the switch 193 may include a high speed switch 194 for high speed switching in order to output high speed data output by the transceiver 197. A video signal output through the transceiver 197 is output in a non-compression state using the switch 193 that can transmit high speed data.

If an external device connected to the connector 191 is a device which does not require a high speed data transmission at step 103, the switch 193 switches the external device to have a path including the USB Switch 195 in step S109. In this case, the controller 101 controls the USB Switch 195 to activate a configuration for supporting a user function necessary for the external device.

The mobile terminal 100 supports a function of the corresponding external device in step S 111.

For example, when the earphone 600 is connected to the interface unit 190, the mobile terminal 100 controls to inactivate the speaker (SPK) and the microphone (MIC) of an audio processor 120 and controls to connect an audio path to the earphone 600. Further, when the charger 200 is connected to the interface unit 190, the mobile terminal 100 forms a path between the power source unit 130 and the charger 200 and controls to charge the power source unit 130 using power of the charger 200.

As described above, an external device operation system according to exemplary embodiments of the present invention switches to connect the transceiver to the external device according to whether the connected external device is an external device which requires a high speed data transmission. If it is not required to transmit high speed data, the external device operation system switches to connect the USB Switch to the external device and controls to efficiently transmit data on an external device basis.

As described above, according to exemplary embodiments of the present invention, in a method of controlling a mobile terminal on an external device basis and an external device operation system using the same, various external devices can be connected to an interface unit, and data can be more efficiently transmitted to external devices having different data transmission methods.

While the invention has been shown and described with reference to certain exemplary embodiments thereof, it will be understood by those skilled in the art that various changes in form and details may be made therein without departing from spirit and scope of the invention as defined in the appended claims and their equivalents.

What is claimed is:

1. A method of controlling a mobile terminal on an external device basis, the method comprising:
   connecting an external device to the mobile terminal;
   determining a type of the connected external device;
   switching, when the connected external device is an external device which requires a high speed data transmission, to connect a transceiver to the external device; and
   switching, when the external device is an external device which does not require a high speed data transmission, to connect a Universal Serial Bus (USB) switch to the external device.

2. The method of claim 1, wherein the determining of the type of the connected external device comprises determining whether the external device is a monitor.

3. The method of claim 1, further comprising:
   receiving at least one of a video signal received by a broadcasting reception module, a video signal input by a camera unit, and a video signal stored in a storage unit; and
   transmitting at least one of the received video signals to the external device through the transceiver IC.

4. The method of claim 3, wherein the transmitting of at least one of the received video signals comprises transmitting at least one of the received video signals to a monitor connected to the connector using a high speed switch for switching in a non-compression state.

5. The method of claim 1, wherein the determining of the type of the connected external device comprises one of an earphone connection for outputting an audio signal of the mobile terminal, a charger connection for charging electric power to a power source unit of the mobile terminal, and a notebook computer or an external memory unit connection for transmitting and receiving data to and from the mobile terminal.

6. The method of claim 1, wherein the determining of the type of the connected external device comprises receiving a plurality of reference values corresponding to external devices, and receiving a signal output from an Identification (ID) port activated according to the connected external device, further wherein the signal output from the ID port, which has a specific resistance value, and the reference values are compared to determine the type of connected external device.

7. The method of claim 6, further comprising:
   determining that the connected external device is a specific device when the specific resistance value is substantially the same as one of the plurality of reference values corresponding to the specific device.

8. The method of claim 1, wherein the determining of the type of the connected external device comprises receiving a first signal from a first signal port by a short circuit for short-circuiting, and receiving a second signal from a second signal port provided in the connected external device, further wherein the first signal and the second signal are compared to determine the type of connected external device.

9. The method of claim 8, further comprising:
   determining that the connected external device is a specific device when the first signal is substantially the same as the second signal which is corresponds to the specific device.

10. An external device operating system of a mobile terminal, the system comprising:
    a connector for connecting an external device;
    a switch for determining a type of the external device connected to the connector and for switching according to the type thereof;
    a transceiver to be connected, when the external device is an external device which requires a high speed data transmission, to the external device according to switching of the switch; and
    a USB switch to be connected, when the external device is an external device which does not require a high speed data transmission, to the external device according to switching of the switch.

11. The system of claim 10, wherein, when the external device is a monitor, the switch switches to connect the transceiver to the external device.

12. The system of claim 10, further comprising:
    at least one of a broadcasting reception module, a camera unit, and a storage unit connected to the transceiver in order to transmit a video signal to the transceiver IC.

13. The system of claim 10, wherein, when the external device is one of an earphone, a charger, a notebook computer, or an external memory unit, the switch switches to connect the USB switch to the external device.

14. The system of claim 13, further comprising:
    at least one of an audio processor for transmitting an audio signal to the earphone, a power source unit for charging using power of the charger, and a storage unit for receiving data from the notebook computer or the external memory unit, or for transmitting data stored in the notebook computer or the external memory unit.

15. The system of claim 10, wherein the switch comprises:
a switch for switching to at least one of the transceiver and the USB switch IC; and
a high speed switch for outputting at least one of a video signal received by a broadcasting reception module, a video signal input by a camera unit, and a video signal stored in a storage unit in a non-compressed state and at a high speed.

16. The system of claim 10, wherein the connector comprises at least one of a first signal port, a second signal port, a reference voltage port, an ID port, and a ground connection port commonly connected to the external device.

17. The system of claim 10, wherein the switch receives a plurality of reference values corresponding to external devices, and also receives a signal output from an Identification (ID) port activated according to the connected external device, further wherein the signal output from the ID port, which has a specific resistance value, and the reference values are compared to determine the type of connected external device,
wherein the switch determines that the connected external device is a specific device when the specific resistance value is substantially the same as one of the plurality of reference values corresponding to the specific device.

18. The system of claim 10, wherein the switch receives a first signal from a first signal port by a short circuit for short-circuiting, and receives a second signal from a second signal port provided in the connected external device, further wherein the first signal and the second signal are compared to determine the type of connected external device.

19. The system of claim 18, wherein the switch determines that the connected external device is a specific device when the first signal is substantially the same as the second signal which corresponds to the specific device.

* * * * *